April 26, 1932. W. G. IMHOFF 1,855,834
GALVANIZING FURNACE
Filed April 8, 1930 2 Sheets-Sheet 2
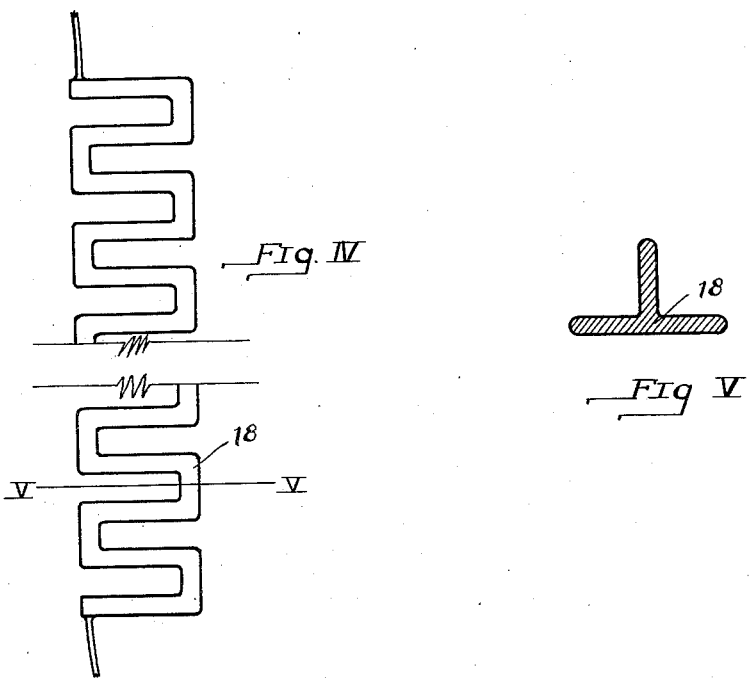
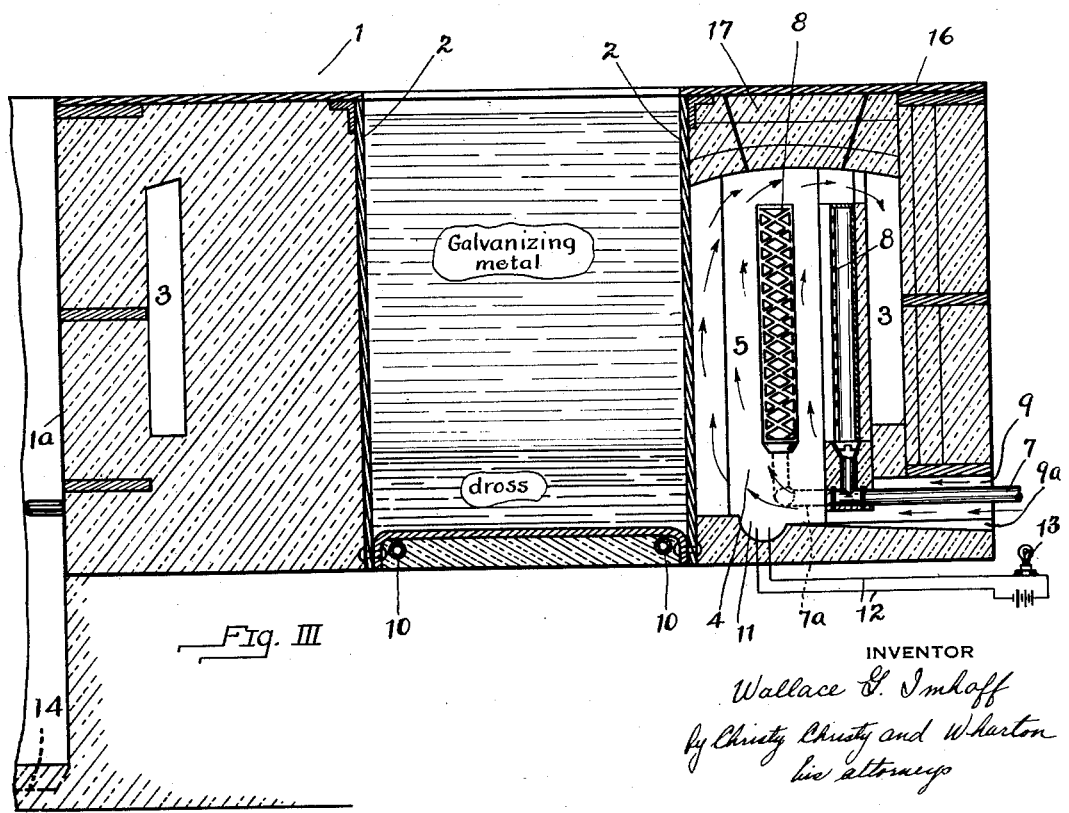

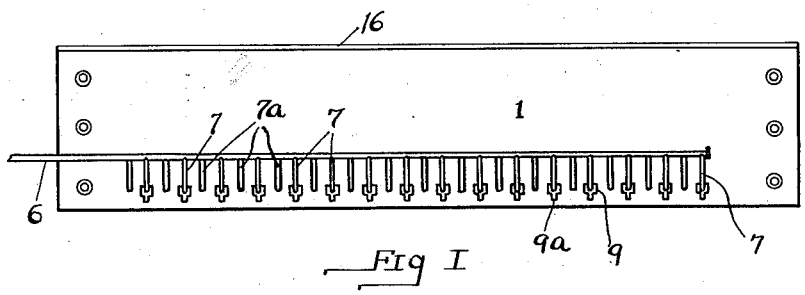
Fig I
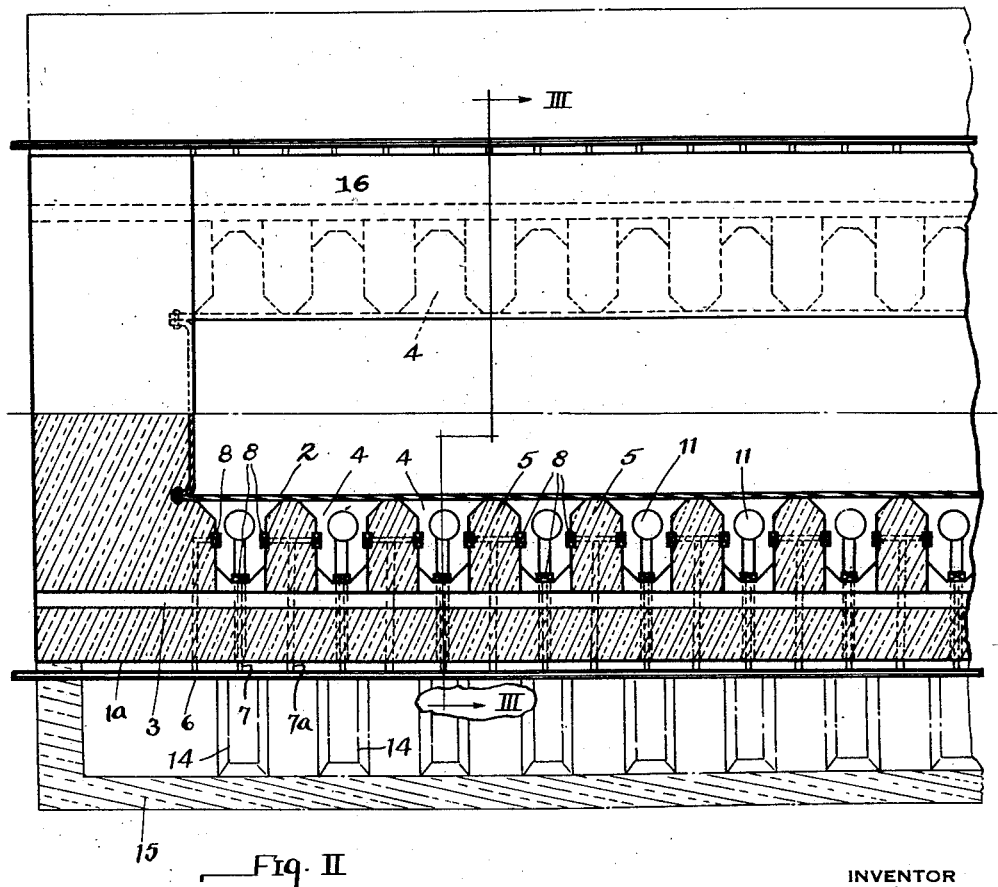
Fig. II

Patented Apr. 26, 1932

1,855,834

UNITED STATES PATENT OFFICE

WALLACE G. IMHOFF, OF PITTSBURGH, PENNSYLVANIA

GALVANIZING FURNACE

Application filed April 8, 1930. Serial No. 442,480.

This invention relates to a hot galvanizing furnace, and is also adapted for use as a furnace for other soft metals such as lead, tin and the like.

The preparation and maintenance of a bath for conducting hot galvanizing presents serious problems. In order to effect efficient galvanizing, without raising the galvanizing kettle to a destructive temperature, it is necessary that the galvanizing bath as a whole be maintained at a temperature higher than 800° Fahrenheit and no higher than 900° Fahrenheit during the abstraction of heat in the galvanizing operation.

The maintenance of a proper heat supply is in itself difficult. In furnaces which heat a galvanizing kettle and bath by the combustion of coke, the temperature of the molten metal in the kettle tends to gradually fall off during galvanizing operations due to an insufficient heat supply. Under such circumstances it is necessary to suspend operations and again raise the contents of the kettle to the galvanizing temperature.

In the galvanizing furnaces as heretofore used there is a tendency to overheat the kettle locally in maintaining the galvanizing temperature, due to the direct impingement of products of combustion in one or more regions on the surface of the kettle. When this has occurred it has been impossible to repair the kettle, and the result has been that the relatively great investment represented by a galvanizing kettle of iron or other ferrous metal is lost. It is further a fact that there is a tendency toward a destructive temperature at the dross line in the kettle; that is, the level in the bath at which a zinc and iron alloy tends to collect. This is for the reason that dross tends to accumulate a high heat intensity, with undue rise in temperature in the region where it lies. As the dross lies adjacent the bottom of the galvanizing kettle, failure at the side in this region due to an unduly high temperature, accentuated by the dross causes the loss of the entire charge of metal in the kettle or of a large portion thereof. While certain types of furnace previously employed have attempted to apply the heating effect above the dross line, attempts to maintain a relatively low temperature in this region of the kettle have not been successful.

In order to supply the necessary heating effect with gas fired galvanizing furnaces it has been the practice to introduce air for combustion under pressure to relatively large burners. Efficient heating is in such case obtained at the risk of unduly high temperatures and local overheating, both of which accelerate destruction of the kettle and produce an early kettle failure. Some kettles so heated have been known to fail within a few weeks of their first use.

It should be borne in mind that in hot galvanizing a great mass of metal must be maintained at the galvanizing temperature of between 800° Fehrenheit and 900° Fahrenheit during the continuance of the galvanizing operation, and in spite of the heat abstraction from the molten bath incident to the galvanizing operation. It should also be borne in mind that the corrosive effect of molten zinc on an iron galvanizing kettle increases with great rapidity at temperatures over 900° Fehrenheit, whether such unduly high temperature be general or localized. Briefly stated, the fundamental problem in maintaining a bath for hot galvanizing is to obtain a uniform heating and an adequate heat supply for the bath, while avoiding any local or general overheating to a temperature higher than 900° Fahrenheit.

In my improved galvanizing furnace I apply the heating effect by means of a large number of small heating chambers arranged to direct the heat wholly above the dross line in the kettle; and by supplying air for combustion at atmospheric pressure, if my heating effect is obtained by the combustion of gas in the heating chambers. By applying the heating effect above the dross line in the kettle and by cooling the kettle below the dross line, I avoid an accentuated rise in temperature in this region due to the presence of the dross, thereby avoiding this particular tendency to pot failure at the dross line.

By the use of a large number of small combustion or heating chambers I am enabled to localize kettle failure, permitting repair of the kettle and minimizing loss of metal due to failure.

Loss of metal due to kettle failure is further minimized by the fact that any such ultimate failure occurs toward the top of the kettle, thus avoiding a sudden outflow of molten metal under the weight of metal in the pot; and by the fact that I provide means giving an alarm upon any escape of metal to indicate the combustion chamber in which there has been a failure, so that such combustion chamber may be immediately blocked off and further outflow prevented. Each heating chamber is readily accessible in itself, so that repairs may be made immediately when a warning signal has been given.

I further so arrange the heating means in my small heating chambers that the means for supplying gas or electric current to the heating means are protected from escaping metal, and provide means for the reception and convenient solidification of metal which may escape from any of the individual heating chambers.

In the accompanying drawings Fig. I is a side elevation of my galvanizing furnace; Fig. II is a view, partly in horizontal section and partly in plan, of the furnace and galvanizing kettle on an enlarged scale; Fig. III is a cross sectional view through the furnace and kettle taken on the line III—III of Fig. II; Fig. IV is a fragmentary elevation of a form of electrical resistor which may be employed in the heating chambers of the furnace; and Fig. V is a cross sectional view through the resistor taken on the line V—V of Fig. IV.

In the drawings reference numeral 1 designates the furnace generally and reference numeral 2 the galvanizing kettle, which is of iron or other suitable ferrous metal. Passing longitudinally through the furnace setting 1a along each side of the kettle 2 are flues 3, which are in communication with combustion or heating chambers 4.

As will be seen by reference to Fig. III of the drawings, the heating chambers 4 are formed by walls 5 of suitable refractory material which extend from the furnace wall proper into contact with or adjacent the wall of the galvanizing kettle 2. A relatively great number of the heating chambers 4 extend along both sides of the galvanizing kettle, so that the total heating effect on the kettle walls is the sum of the effects received from a great number of chamber units.

In the heating chambers 4 are one or more heating elements, indicated diagrammatically in Fig. II of the drawings; and which may be combustion elements for gas as shown in Fig. III, or electric resistance elements such as are shown generally in Figs. IV and V. Considering the combustion elements as shown in Fig. III, gas is supplied from a main line 6 (Fig. II), and passes through branch lines 7 and 7a to the individual combustion elements 8. These combustion elements 8 may be formed of any heat radiating material, but are desirably refractory structures such as those shown. It will be noted that the branch gas lines 7 enter ports 9 adjacent the bottom of the furnace setting, and that they are so mounted as to leave an appreciable space 10 beneath them. Also the separate connections 7a for the several combustion elements are so arranged that they lie wholly within the refractory material of the furnace wall. As indicated in Fig. III of the drawings, air for combustion enters through ports 9 and passes around and through the structure of the combustion elements 8, the products of combustion finally passing to the longitudinal flues 3.

The combustion elements 8 are mounted above the dross line in the galvanizing kettle, and heat from these elements is directed inwardly and upwardly against the kettle wall. In order to further lessen the heating effect in this region of the kettle I provide a cooling coil or coils 10, which are shown disposed beneath the bottom of the kettle but which may be caused to extend along the sides of the kettle adjacent its bottom if so desired.

In preparing a bath of zinc for hot galvanizing the temperature of the great mass of metal within the kettle may be brought to the proper galvanizing point with relatively great rapidity because of the perfect distribution of heat along both sides of the kettle provided by the heating chambers 4. This effect is secured without raising the kettle wall to an unduly high temperature, because of this distribution which permits the application of a great quantity of heat units at a relatively low temperature.

During galvanizing the temperature of the bath may be accurately regulated, and may be maintained uniform throughout the entire length of the kettle. If for example articles to be galvanized are introduced into the bath adjacent the left-hand end of the kettle as shown in Fig. III, there is a greater heat abstraction at that end than at the right-hand, or leaving end, of the kettle. By regulating the fuel supply to the several heating chambers an accurate regulation may be obtained, so that the temperature is uniform throughout the entire body of the bath.

It is to be particularly noted that the use of combustion elements within a number of heating chambers permits the quiet burning of gas at atmospheric pressure without the use of blowers. The heating effect is thus obtained without projecting flame or products of combustion violently against the kettle wall in such manner as to produce local overheating. Also the heating effect is more adequate than that obtained by forced combustion, because of the distribution of such heating effect the entire length of the kettle so that a great quantity of heat is supplied to the bath as a whole.

My furnace is so arranged as to minimize injury to the kettle and loss of metal upon failure of the kettle in any heated region. In order that there may be any immediate warning of kettle failure at any one of the combustion chambers 4, I provide a pocket 11 in the furnace floor and underlying the heating chamber. Into each of these pockets 11 project the terminals of an electric circuit 12, which has therein signalling means, shown as an electric lamp 13, but which may be an electric bell or other suitable means for giving an alarm. Upon failure of the kettle in any one of the combustion chambers, molten metal in that chamber immediately flows into pocket 11 and forms a connection between the terminals of circuit 12, thus giving the alarm. This molten metal then flows outwardly through port 9 and particularly by way of the inclined channel 9a therein. Because of the positioning of the gas pipe 7, and of the branch pipes 7a, there is little likelihood of injury to these pipes. The outflowing metal passes by way of channel 9a into suitable molds 14 of concrete or the like, which are positioned between the furnace wall proper 1a and an outer wall 15.

As soon as the alarm is given the escape of metal through the heating chamber may be checked by blocking off that particular chamber at which the kettle wall has failed. This may be effected readily by removing the plate 16 and the refractory block 17 which cover that chamber, and by introducing filling material into the chamber. Desirably such filling material consists of fire clay, and a mixture of iron filings, muriatic acid, and salt. Such filling serves not merely as a temporary stoppage to prevent further loss of metal, also serves as a permanent repair to the kettle wall. The mass of iron filings rapidly corrode and a solid wall which is not penetrable by molten zinc and which possesses relatively great enduring properties is formed. Operations can thus be continued without utilizing the particular heating chamber in which failure has occurred. Because of the great number of small heating chambers provided, several chambers may be blocked off because of kettle failure before it is necessary to scrap the kettle.

Instead of combustion elements as shown in Figs. II and III, I may use electric heating elements 18, mounted in substantially the same position in the heating chambers as the combustion elements 8. The general furnace arrangement is not changed or altered in any way by such substitution, since the electrical connections may be introduced through the ports 9 and disposed in a manner similar to the positioning of the gas connections 7 and 7a. Obviously, however, when electrical connections are used the furnace flues 3 become unnecessary.

As above indicated the ribbon effect of heat application extends along the entire wall of the kettle above the dross line therein. The area of heat application is continuous except for the relatively narrow areas in which the kettle wall is contacted by the wall extensions 5 which form the heating chambers. It will be noticed that the end of each of these extensions 5 is bevelled, in order to increase the surface area of the kettle subjected to the direct heating effect, and to minimize the area on the kettle wall which is heated by conduction from the directly heated areas thereof. The distributive effect thus produced supplies a great quantity of heat to the kettle wall as a whole, and to the bath within the kettle. The temperature of all portions of the kettle above the dross line is thus uniform, no extended area of the kettle wall being heated by conduction from another portion thereof, with a consequently requisite high temperature in a region or regions from which heat is conducted to the kettle wall as a whole. Heat application is efficient, so that the desired galvanizing temperature within the metal of the bath is obtained and maintained with great economy in the consumption of fuel or electric current.

It is obvious that, insofar as the distributive heating effect is concerned, the results may be obtained by a series of small heating chambers arranged horizontally rather than vertically, as shown.

What I claim is:

1. In combination with a metallic kettle for galvanizing and the like, a furnace having a wall extending along a side of the kettle, a series of small heating chambers in the furnace wall and arranged to supply heat to the kettle along the wall thereof, heating elements in the chambers positioned to direct the heating effect upwardly of the dross line in the kettle, the series of chambers being so arranged that the heating effect therefrom is distributed uniformly throughout all regions of the kettle wall upwardly of the dross line, and cooling means in the furnace disposed below the dross line in the kettle for lowering the temperature of that portion of the kettle.

2. In combination with a metallic kettle for galvanizing and the like, a furnace wall extending along the kettle, a series of deep and narrow heating chambers extending vertically in the furnace wall and opening against the wall of the kettle, said narrow chambers individually isolated in the furnace wall throughout their length save for flue connection in the upper region thereof, and heating elements mounted in said chambers, said elements so constituted and arranged that they radiate heat to the kettle wall and do not direct products of combustion thereagainst, each said chamber serving as an enclosed conduit for escaping metal.

3. In combination with a metallic kettle for galvanizing and the like, a furnace wall extending along the kettle, a series of deep and narrow heating chambers extending vertically in the furnace wall and opening against the wall of the kettle, said narrow chambers individually isolated in the furnace wall throughout their length save for flue connection in the upper region thereof, and heating elements mounted in said chambers, said elements so constituted and arranged that they radiate heat to the kettle wall and do not direct products of combustion thereagainst, each said chamber serving as an enclosed conduit for escaping metal; and a series of ports through the furnace individually communicating with the several chambers adjacent the base thereof, each said port co-operating with the flue connection of the chamber to pass a current of air between the heating elements therein and the wall of the kettle and serving as an outlet conduit for escaping metal.

4. In combination with a metallic kettle for galvanizing and the like, a furnace wall extending along the kettle, a series of deep and narrow heating chambers extending vertically in the furnace wall and opening against the wall of the kettle, said narrow chambers individually isolated in the furnace wall save for flue connection in the upper region thereof, and heating elements in the chambers mounted against the walls thereof and above the dross line of the kettle, said elements so constituted that they radiate heat to the kettle wall and do not direct products-of combustion thereagainst, each said chamber serving as an enclosed conduit for escaping metal.

5. In combination with a metallic kettle for galvanizing and the like, a furnace wall extending along the kettle, a series of deep and narrow heating chambers extending vertically in the furnace wall and opening against the wall of the kettle, said narrow chambers individually isolated in the furnace wall save for flue connection in the upper region thereof, heating elements in the chambers mounted against the walls thereof and above the dross line of the kettle, said elements so constituted that they radiate heat to the kettle wall and do not direct products of combustion thereagainst, each said chamber serving as an enclosed conduit for escaping metal, and a series of ports through the furnace wall individually communicating with the several chambers adjacent the base thereof, each said port co-operating with the flue connection of the chamber to pass a current of air between the heating elements therein and the wall of the kettle and serving as an outlet conduit for escaping metal.

In testimony whereof I have hereunto set my hand.

WALLACE G. IMHOFF.